(12) United States Patent
Ashikawa et al.

(10) Patent No.: US 11,620,981 B2
(45) Date of Patent: Apr. 4, 2023

(54) SPEECH RECOGNITION ERROR CORRECTION APPARATUS

(71) Applicant: KABUSHIKI KAISHA TOSHIBA, Tokyo (JP)

(72) Inventors: Taira Ashikawa, Kawasaki (JP); Hiroshi Fujimura, Yokohama (JP); Kenji Iwata, Machida (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/012,372

(22) Filed: Sep. 4, 2020

(65) Prior Publication Data

US 2021/0280168 A1 Sep. 9, 2021

(30) Foreign Application Priority Data

Mar. 4, 2020 (JP) .............................. JP2020-036631

(51) Int. Cl.
*G10L 15/01* (2013.01)
*G10L 15/28* (2013.01)
(Continued)

(52) U.S. Cl.
CPC .............. *G10L 15/01* (2013.01); *G10L 15/22* (2013.01); *G10L 15/285* (2013.01); *G10L 15/30* (2013.01); *G10L 2015/223* (2013.01)

(58) Field of Classification Search
CPC ....... G10L 15/01; G10L 15/22; G10L 15/285; G10L 15/30; G10L 2015/223
(Continued)

(56) References Cited

U.S. PATENT DOCUMENTS

2002/0138265 A1* 9/2002 Stevens ................... G10L 15/22
704/E15.04
2012/0330662 A1 12/2012 Saikou
(Continued)

FOREIGN PATENT DOCUMENTS

JP 2014077865 A * 5/2014
JP 2014119559 A * 6/2014
(Continued)

OTHER PUBLICATIONS

A. Ogawa, T. Hori and A. Nakamura, "Estimating Speech Recognition Accuracy Based on Error Type Classification," in IEEE/ACM Transactions on Audio, Speech, and Language Processing, vol. 24, No. 12, pp. 2400-2413, Dec. 2016, doi: 10.1109/TASLP.2016.2603599. (Year: 2016).*

(Continued)

*Primary Examiner* — Bharatkumar S Shah
(74) *Attorney, Agent, or Firm* — Oblon, McClelland, Maier & Neustadt, L.L.P.

(57) ABSTRACT

According to one embodiment, a speech recognition error correction apparatus includes a correction network memory and an error correction circuitry. The error correction circuitry calculates a difference between a speech recognition result string of an error correction target, which is a result of performing speech recognition on a new series of speech data, and a correction network, where a speech recognition result string and a correction result by a user for the speech recognition result string are associated, and when a value indicating the difference is equal to or less than a threshold, perform error correction on a speech recognition error portion in the speech recognition result string of the error correction target by using the correction network to generate a speech recognition error correction result string.

13 Claims, 7 Drawing Sheets

(51) Int. Cl.
G10L 15/22 (2006.01)
G10L 15/30 (2013.01)

(58) Field of Classification Search
USPC .......................................................... 704/231
See application file for complete search history.

(56) References Cited

U.S. PATENT DOCUMENTS

| | | | | |
|---|---|---|---|---|
| 2014/0012579 | A1* | 1/2014 | Ganong, III | ............ G10L 15/08 704/E15.001 |
| 2014/0195226 | A1* | 7/2014 | Yun | ........................ G10L 15/01 704/231 |
| 2021/0272550 | A1* | 9/2021 | Aher | ...................... G10L 15/063 |

FOREIGN PATENT DOCUMENTS

| | | |
|---|---|---|
| JP | 5796496 B2 | 10/2015 |
| JP | 2017-134162 A | 8/2017 |
| JP | 2018-4976 A | 1/2018 |
| JP | 6300394 B2 | 3/2018 |
| WO | WO-2018208491 A1 * 11/2018 ........... G06F 3/0484 |

OTHER PUBLICATIONS

A. Ogawa, T. Hori and A. Nakamura, "Estimating Speech Recognition Accuracy Based on Error Type Classification," in IEEE/ACM Transactions on Audio, Speech, and Language Processing, vol. 24, No. 12, pp. 2400-2413, Dec. 2016, doi: 10.1109/TASLP.2016.2603599. (Year: 2016) (Year: 2016).*

A. Ogawa, T. Hori and A. Nakamura, "Estimating Speech Recognition Accuracy Based on Error Type Classification," in IEEE/ACM Transactions on Audio, Speech, and Language Processing, vol. 24, No. 12, pp. 2400-2413, Dec. 2016, doi: 10.1109/TASLP.2016.2603599. (Year: 2016) (Year: 2016) (Year: 2016).*

* cited by examiner

SPEECH RECOGNITION ERROR CORRECTION APPARATUS

CROSS REFERENCE TO RELATED APPLICATIONS

This application is based upon and claims the benefit of priority from Japanese Patent Application No. 2020-036631, filed Mar. 4, 2020; the entire contents of which are incorporated herein by reference.

FIELD

Embodiments described herein relate generally to a speech recognition error correction apparatus.

BACKGROUND

A speech recognition apparatus is a device that recognizes speech of a human by utilizing a large-vocabulary continuous speech recognition technology, and is used for computer input support, spoken dialogue, etc.

In this speech recognition apparatus, there is a possibility that an error may be contained in a speech recognition result due to the environment when speaking, the way of speaking, unknown words, etc. Accordingly, a speech recognition error correction technology of correcting the recognition result by utilizing a past correction history and a database corresponding to a particular item has been suggested.

DETAILED DESCRIPTION

In general, according to one embodiment, a speech recognition error correction apparatus includes a correction network memory and an error correction circuitry. The correction network memory stores a correction network. The correction network includes a network where a speech recognition result string, which is a result of performing speech recognition on a series of speech data, and a correction result by a user for the speech recognition result string are associated. The error correction circuitry calculates a difference between a speech recognition result string of an error correction target, which is a result of performing speech recognition on a new series of speech data, and the correction network stored in the correction network memory. When a value indicating the difference is equal to or less than a threshold, the error correction circuitry performs error correction on a speech recognition error portion in the speech recognition result string of the error correction target by using the correction network to generate a speech recognition error correction result string.

Hereinafter, embodiments will be described with reference to the accompanying drawings. Speech recognition error correction apparatuses according to the embodiments are assumed to be used in, for example, an automatic captioning system and a reporting agent system. The automatic captioning system is a system that recognizes and automatically converts speech into characters and displays them for the deaf and hard of hearing. The reporting agent system has a function of capturing a content to be reported from a user's natural conversation and creating a report of the content.

First Embodiment

Figure 1:
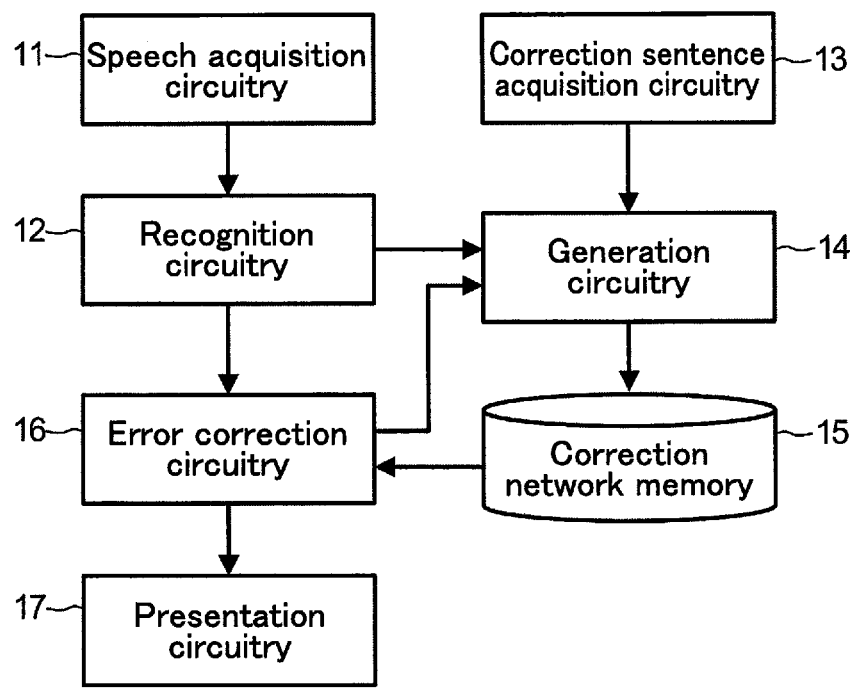
FIG. 1 is a block diagram showing a configuration of a speech recognition error correction apparatus according to a first embodiment.

FIG. 1 is a block diagram showing a configuration of a speech recognition error correction apparatus 10 according to a first embodiment. The speech recognition error correction apparatus 10 includes a speech acquisition circuitry 11, a recognition circuitry 12, a correction sentence acquisition circuitry 13, a generation circuitry 14, a correction network memory 15, an error correction circuitry 16, and a presentation circuitry 17.

The speech acquisition circuitry 11 acquires a series of speech data corresponding to a sentence spoken by a user. For example, the speech acquisition circuitry 11 can acquire a series of speech data by sequentially digitizing real-time speech collected by a microphone. In addition, the speech acquisition circuitry 11 may acquire a series of speech data by reading it out from a speech file recorded in advance in a storage medium.

The recognition circuitry 12 performs known speech recognition processing on the series of speech data acquired by the speech acquisition circuitry 11, and generates a speech recognition result string. The speech recognition result string generated by this recognition circuitry 12 may be at least any one of a text, a lattice that is a candidate network, and a confusion network. A text is one or more characters or words that may compose a spoken sentence. A lattice is a graph expressing one or more characters or words that may compose a spoken sentence as a digraph. Even if a plurality of characters or words are the same as each other, if a start time or end time is different in the characters or words, they are recorded as different arcs. Thus, the lattice include redundant arcs. A confusion network expresses candidates of a plurality of characters or words as a graph type data structure in the same manner as the lattice. A lattice can be converted into a confusion network by contracting the same labels belonging to nearby time zones within the lattice to one label and collecting different labels belonging to nearby time zones within the lattice to generate one opposing candidate group.

The correction sentence acquisition circuitry 13, for example, acquires a correction sentence, where a user manually corrected the speech recognition result string generated by the recognition circuitry 12.

The generation circuitry 14 generates a correction network based on the speech recognition result string generated by the recognition circuitry 12 and the correction sentence acquired by the correction sentence acquisition circuitry 13, and stores, i.e., adds, the correction network to the correction network memory 15. The correction network is a network in which a speech recognition result string for a series of speech data and a correction sentence for the speech recognition result string are associated. In addition, if a correction network for the same speech recognition result string is already stored in the correction network memory 15, the generation circuitry 14 overwrites the already-stored correction network with the newly-generated correction network. Thereby, the correction network stored in the correction network memory 15 can be updated.

The correction network memory 15 stores a correction network.

Based on the speech recognition result string generated by the recognition circuitry 12 and the correction network generated by the generation circuitry 14 and stored in the correction network memory 15, the error correction circuitry 16 generates an error correction sentence of the speech recognition result string.

The presentation circuitry 17 presents the error correction sentence of the speech recognition result string generated by the error correction circuitry 16 to the user. Thus, the presentation circuitry 17 can include a display device. In addition, the presentation circuitry 17 may also transmit the error correction sentence of the speech recognition result string to an external device via a network so as to present the error correction sentence to a user of the external device at the external device.

Note that the correction sentence acquisition circuitry 13 can include an input device for inputting a correction sentence for a portion that needs to be corrected in the speech recognition result string. In addition, the correction sentence acquisition circuitry 13 may transmit the speech recognition result string to the external device via the network, and receive the correction sentence transmitted from the external device. The transmission of the speech recognition result string to the external device may be performed by the recognition circuitry 12, and the correction sentence acquisition circuitry 13 may receive the correction sentence from the external device. Furthermore, the correction sentence acquisition circuitry 13 may acquire a correction sentence, where a user manually corrected the error correction sentence of the speech recognition result string presented by the presentation circuitry 17. Thereby, the generation circuitry 14 can add or update the correction network based on the error correction sentence of the speech recognition result string generated by the error correction circuitry 16 and the correction sentence acquired by the correction sentence acquisition circuitry 13.

Figure 2:
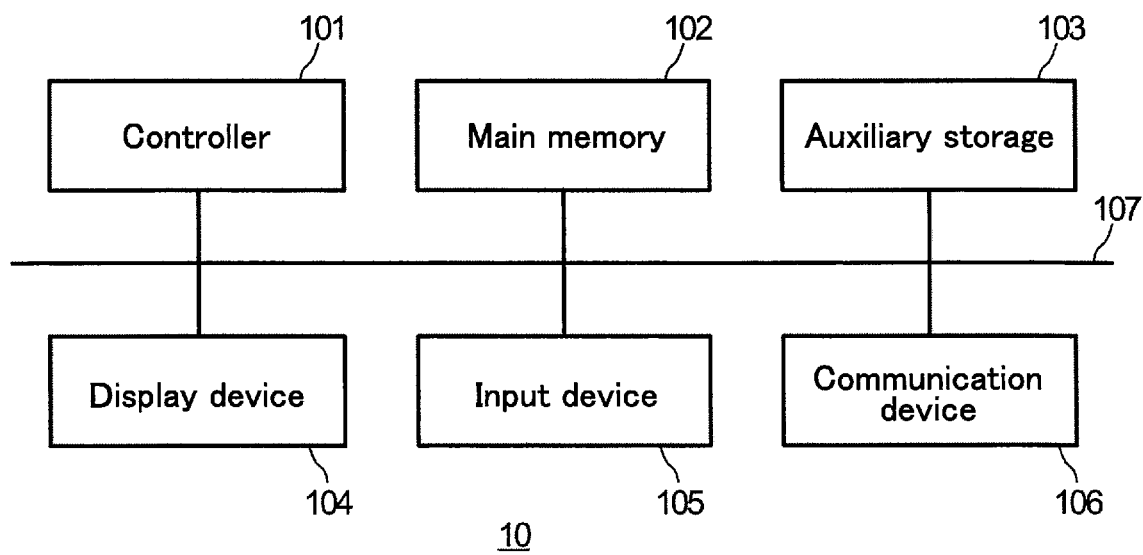
FIG. 2 is a block diagram showing an example of a hardware configuration of the speech recognition error correction apparatus.

FIG. 2 is a block diagram showing an example of a hardware configuration of the speech recognition error correction apparatus 10. The speech recognition error correction apparatus 10 includes a controller 101, a main memory 102, an auxiliary storage 103, a display device 104, an input device 105, and a communication device 106. The controller 101, main memory 102, auxiliary storage 103, display device 104, input device 105, and communication device 106 are connected via a bus 107.

The controller 101 executes a program read out from the auxiliary storage 103 to the main memory 102. The controller 101 is, for example, one or more processors, such as a CPU. The main memory 102 is a memory, such as a ROM (Read Only Memory) and a RAM (Random Access Memory). The auxiliary storage 103 is a non-volatile storage device, such as a memory card such as an SSD (Solid State Drive) or an HDD (Hard Disk Drive).

The display device 104 displays information. The display device 104 is, for example, a liquid crystal display. The input device 105 receives input of information. The input device 105 is, for example, a keyboard and a mouse. Note that the display device 104 and input device 105 may be a liquid crystal touch panel having both display and input functions, etc. In addition, the input device 105 can include a microphone for speech input. The communication device 106 communicates with other devices.

A program executed by the controller 101 can be stored in a computer-readable storage medium, such as a CD-ROM, memory card, CD-R, and DVD (Digital Versatile Disk), as a file in an installable or executable format, and provided as a computer program product.

In addition, a program executed by the controller 101 may be stored in a computer connected to a network, such as the Internet. In this case, the speech recognition error correction apparatus 10 can utilize the program by downloading the program into the auxiliary storage 103 via the network by using the communication device 106. The speech recognition error correction apparatus 10 may be formed to utilize a program to be executed by reading out the program to the main memory 102 via the network, such as the Internet, without downloading the program.

A program to be executed by the controller 101 may be formed to be incorporated into the ROM, etc. of the main memory 102 in advance, and provided.

A program to be executed by the controller 101 has a module configuration including a function realizable by the program among functional configurations of the speech recognition error correction apparatus 10.

A function to be realized by a program is loaded into the main memory 102 by the controller 101 reading out the program from a storage medium, such as the auxiliary storage 103, and executing the program. That is, a function to be realized by a program is generated in the main memory 102.

Note that some functions of the speech recognition error correction apparatus 10 may be realized by an IC (Integrated Circuit), such as an ASIC (Application Specific Integrated Circuit), FPGA (Field Programmable Gate Array), and GPU (Graphics Processing Unit), i.e., a hardware. The IC is, for example, a processor that executes dedicated processing.

In addition, in a case of realizing the functions by using a plurality of processors, each processor may realize one of the functions, or two or more of the functions.

The speech recognition error correction apparatus 10 may have a discretionary operation form. The speech recognition error correction apparatus 10 may be operated as a cloud system on a network, for example.

Figure 3:
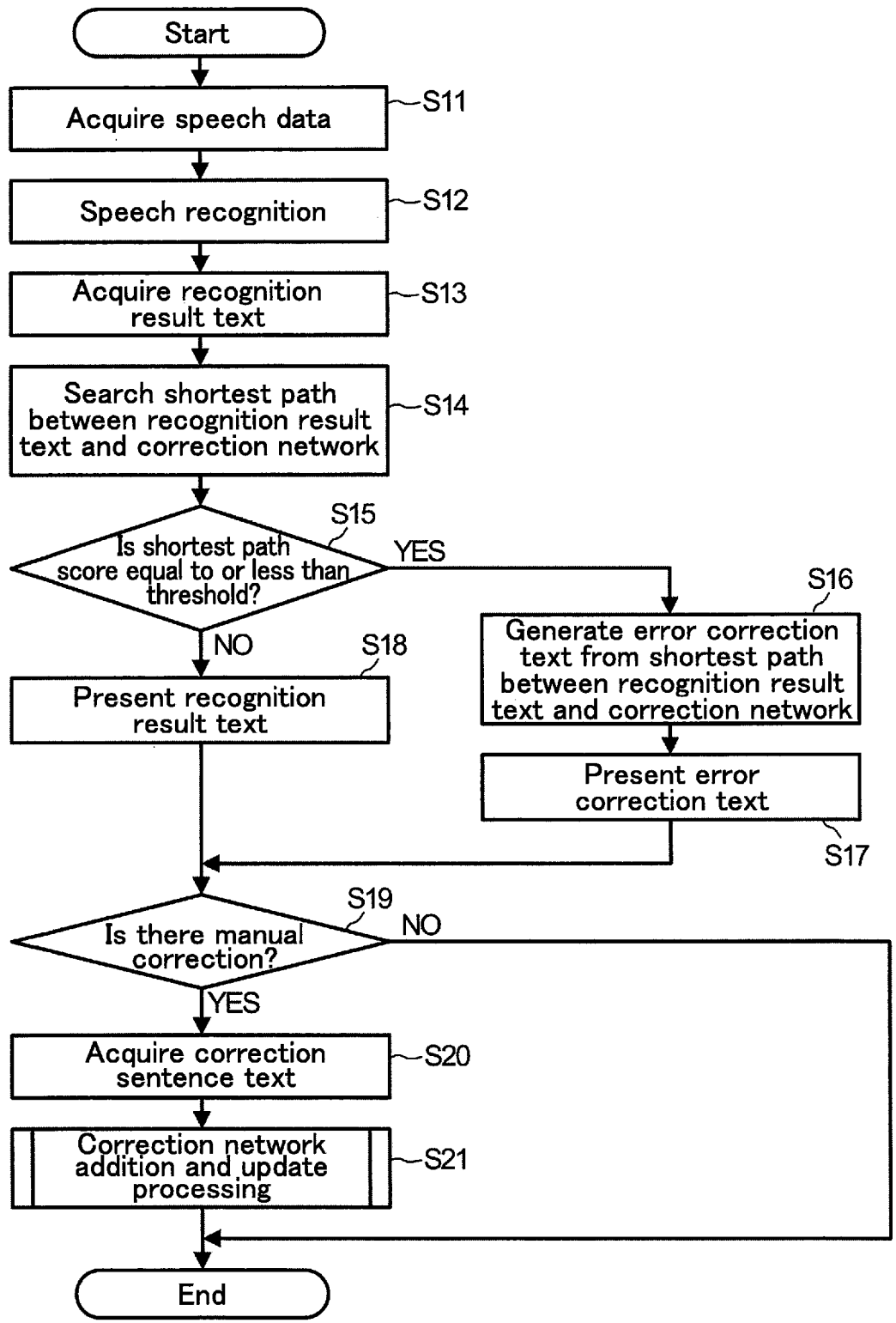
FIG. 3 is a flowchart indicating a procedure of a processing function of the speech recognition error correction apparatus.

Hereinafter, the operation of the speech recognition error correction apparatus 10 will be described in detail. FIG. 3 is a flowchart showing a procedure of a processing function of the speech recognition error correction apparatus 10, which is realized by a processor, which is the controller 101, executing a speech recognition error correction program.

First, the speech acquisition circuitry 11 acquires speech data (step S11). For example, the speech acquisition circuitry 11 collects speech by a microphone of the input device 105 and generates speech data so as to acquire the speech data.

Next, the recognition circuitry 12 performs known speech recognition processing on the speech data acquired by the speech acquisition circuitry 11, and generates a speech recognition result string (step S12). The generated speech recognition result string is at least any one of a text (character string), a lattice that is a candidate network, and a confusion network. As the speech recognition result string, a plurality of candidates from a first candidate to an nth candidate (n is an integer of 2 or more) can be obtained. How many candidates will be used may be decided in advance, or may be set by the user discretionarily. A lattice or confusion network can include these plurality of candidates in one lattice or confusion network. In a case where the speech recognition result string is a text, a plurality of candidate texts are respectively generated. Hereinafter, for simplicity of explanation, a case where the first candidate text is generated as the speech recognition result string will be explained as an example.

The error correction circuitry 16 first acquires a recognition result text, which is the speech recognition result string generated by the recognition circuitry 12 (step S13). Then, the error correction circuitry 16 generates an error correction text, where a recognition error of the speech recognition result string is corrected, based on the acquired recognition result text and the correction network stored in the correction network memory 15 formed in the auxiliary storage 103. Specifically, the error correction circuitry 16 searches for a difference between the recognition result text generated by the recognition circuitry 12 and the correction network stored in the correction network memory 15, e.g., a shortest path (step S14). Then, the error correction circuitry 16 determines whether or not its minimum score of the shortest path (shortest path score) is equal to or less than a certain threshold (step S15). If the shortest path score is equal to or less than the threshold, the error correction circuitry 16 generates the error correction text from the shortest path between the recognition result text and correction network (step S16).

The presentation circuitry 17 presents the error correction text of the speech recognition result string, which is the speech recognition error correction result string generated by the error correction circuitry 16, to the user by the display device 104 (step S17). If the error correction circuitry 16 determines that the shortest path score is larger than the threshold in the above step S15, the presentation circuitry 17 presents, by the display device 104, the recognition result text, which is the speech recognition result string generated by the recognition circuitry 12 (step S18). Note that the presentation circuitry 17 may present the recognition result text or error correction text to the external device via the network by the communication device 106, instead of being presented by the display device 104.

The correction sentence acquisition circuitry 13 determines whether or not a manual correction is performed by the user to the recognition result text or error correction text presented by the presentation circuitry 17 (step S19). This can be determined by, for example, whether there is a correction operation by a user operation of the input device 105 or there is a reception of a correction sentence text from the external device by the communication device 106. If the manual correction is not performed, the speech recognition error correction apparatus 10 ends the processing shown in this flowchart.

In contrast, if it is determined that the manual operation is performed, the correction sentence acquisition circuitry 13 acquires the correction sentence text that is a result of the manual correction (step S20).

The generation circuitry 14 executes correction network addition and update processing (step S21). In this correction network addition and update processing, the generation circuitry 14 generates and updates the correction network based on the recognition result text or error correction text, which is the text presented by the presentation circuitry 17, and the correction sentence text acquired by the correction sentence acquisition circuitry 13. Specifically, the generation circuitry 14 determines the shortest path between the recognition result text or error correction text and the correction sentence text, and if the shortest path score is equal to or less than a certain threshold, adds the recognition result text or error correction text and the correction sentence text to the correction network. If the generation circuitry 14 ends this correction network addition and update processing, the speech recognition error correction apparatus 10 ends the processing shown in this flowchart.

Figure 4:
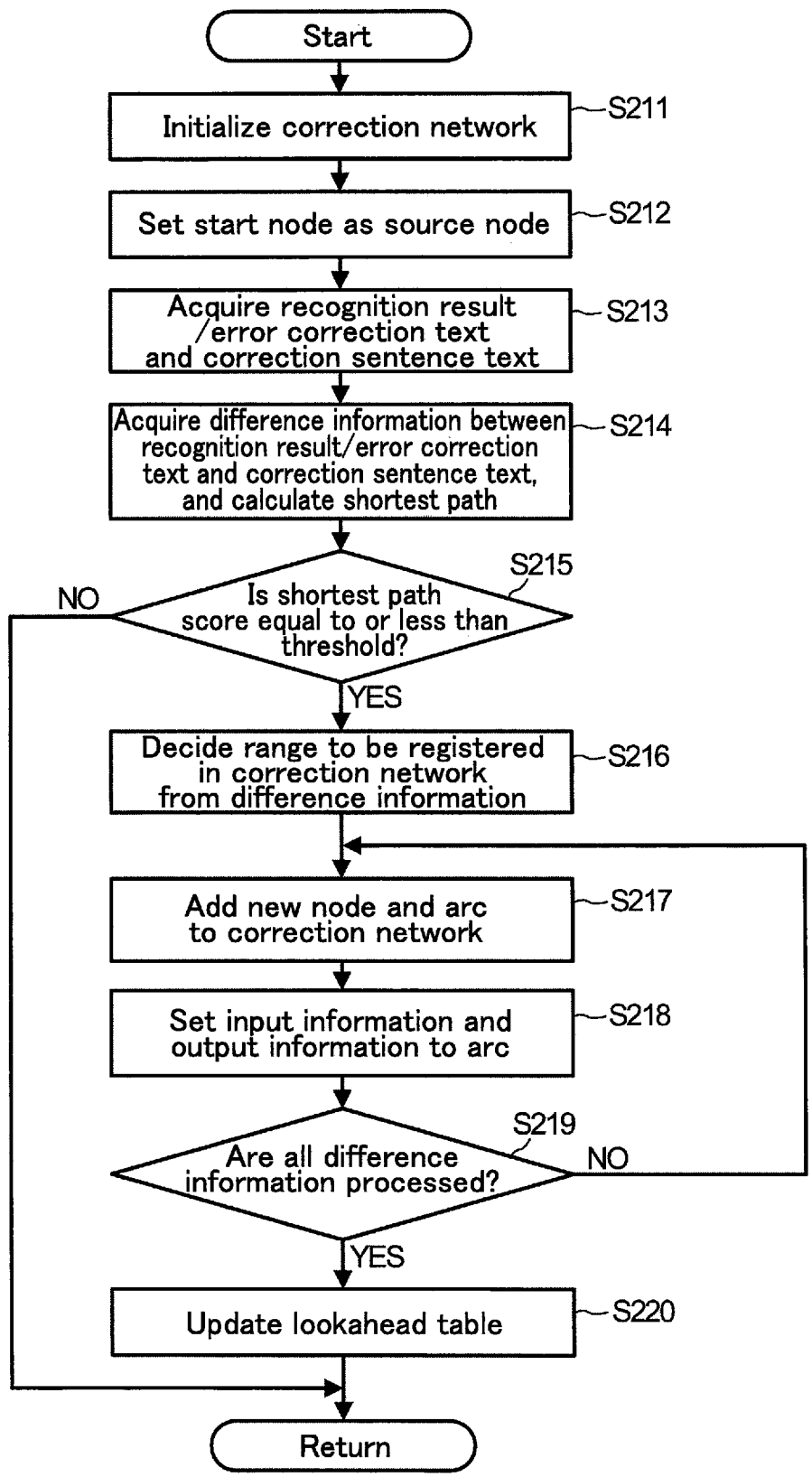
FIG. 4 is a flowchart showing a detailed processing procedure of correction network addition and update processing in FIG. 3.

FIG. 4 is a flowchart showing a detailed processing procedure of the correction network addition and update processing of the Above step S21. The correction network can utilize a finite state transducer (FST) that is also utilized in speech recognition. The FST is a converter that consists of nodes representing states and arcs representing a transition between nodes, and can have input information and output information in the arcs. In addition, in the arc, either one of or both of input and output can be set to be empty, and the case where input is output is referred to as ε-transition. The generation circuitry 14 generates and updates the correction network by using the recognition result text that is the first candidate character string of the speech recognition result string and the correction sentence text that is a result of the user's manual correction. Alternatively, the generation circuitry 14 generates and updates the correction network by using the error correction text, where an error in the recognition result text is automatically corrected, and the correction sentence text. In this correction network generation and update processing, there are a method of processing in character units and a method of performing morpheme analysis inside the generation circuitry 14 and processing in word units. These methods are the same processing except for whether or not the morpheme analysis is performed first. Hereinafter, a case of processing in character units will be explained as an example.

In the correction network addition and update processing in step S21, the generation circuitry 14 first initializes the correction network FST (step S211). That is, the generation circuitry 14 creates the correction network FST having a start node in an end state in an initial state and an end node having arc that follows s-transition from the initial state and follows ε-transition to the initial state node, and stores the correction network FST in the correction network memory 15.

Next, the generation circuitry 14 performs the following update processing on the above correction network FST created and stored in the correction network memory 15.

Namely, the generation circuitry 14 first sets the start node of the correction network FST generated in the above step S211 as a source node (step S212).

Next, the generation circuitry 14 acquires the recognition result text that is the speech recognition result string from the recognition circuitry 12 or the error correction text that is a result of correcting the error from the error correction circuitry 16, as a recognition text, and acquires the correction sentence text from the correction sentence acquisition circuitry 13 (step S213).

Next, the generation circuitry 14 acquires difference information between the recognition text, which is the recognition result text or error correction text, and the correction sentence text, and calculates a shortest path (step S214). That is, the generation circuitry 14 uses a pattern matching technique, such as a commonly used gestalt pattern matching, to determine which one of match M, replace R, insert I, and delete D the difference information is in each character. Then, the generation circuitry 14 determines the shortest path between the recognition text and correction sentence text from this difference information. When determining this shortest path, each of the match M, replace R, insert I, and delete D may have a different score.

Figures 5, 6, 7:
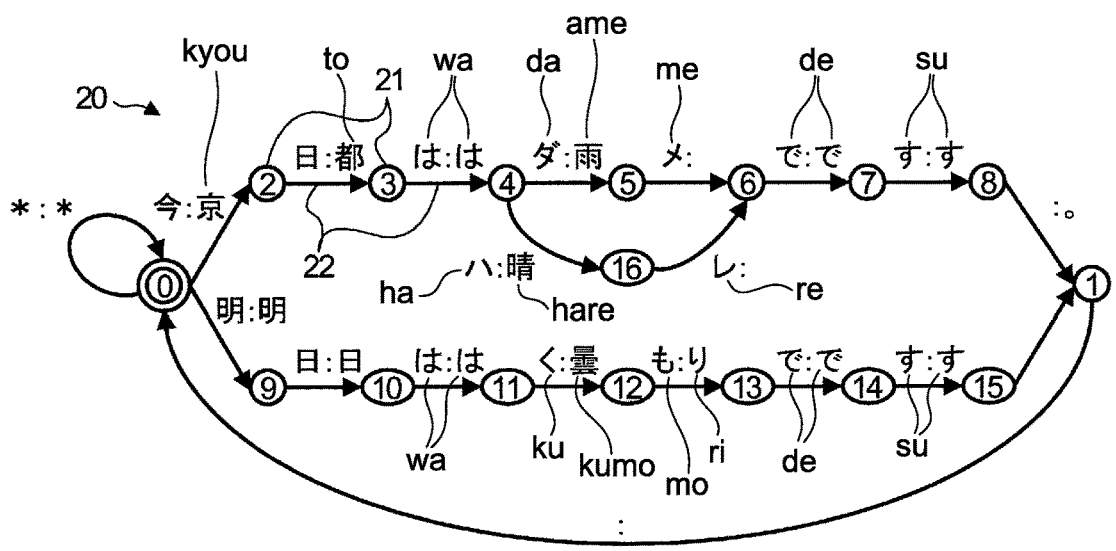
FIG. 5 is a diagram showing an example of a recognition result text, a correction sentence text, and difference information.
FIG. 6 is a diagram showing an example of a correction network FST.
FIG. 7 is a diagram showing a content example of a lookahead table corresponding to the example of FIG. 6.

FIG. 5 is a diagram showing an example of a recognition result text, a correction sentence text, and difference information. In Japanese, even with the same pronunciation, some characters are represented by one character, and others are represented by a plurality of characters. In addition, there are characters or words that have the same pronunciation but have different meanings. The sentence "今日はダメです" as an example of the recognition result text in FIG. 5 is pronounced as "kyou-wa-dsme-desu" in Japanese, meaning that "Today is no good". The sentence "京都は雨です。" as an example of the correction sentence text is pronounced as "kyouto-wa-ame-desu", meaning that "It's raining in Kyoto." "。" corresponds to a period.

Next, the generation circuitry 14 determines whether or not the shortest path score is equal to or less than a certain threshold (step S215). That is, the speech recognition result string may be significantly in error due to environmental noise, etc., and it will not be appropriate to learn the correction result at that time. Accordingly, if a difference between the recognition text and correction sentence text is large, such a result will not be added to the correction network. Thus, the generation circuitry 14 determines an edit distance that is a score of the shortest path, and if the edit distance is larger than a predetermined threshold, will not perform the following processing of adding to the correction network and will end this correction network addition and update processing. Note that what is compared with this threshold may be, instead of the edit distance, an average value obtained by dividing the edit distance by the number of characters.

If it is determined that the shortest path score is equal to or less than the threshold, the generation circuitry 14 decides a range to be registered in the correction network FST from the difference information (step S216). This range to be registered may cover all the difference information. Alternatively, in order to suppress the size of the correction network FST, the range to be registered may be a range including several before and after delete D, insert I, or replace R, except for portions that match M consecutively in the difference information. For example, in a case of including one before and after, if the difference information is MMMRRMMM, the portion of MRRM may be set to be the range, with the first MM and the last MM being out of the range.

The generation circuitry 14 performs the following processing on the difference information of this decided range.

First, the generation circuitry 14 adds a new node and arc to the correction network FST (step S217). That is, if the target difference information in the difference information is not the end of the range to be registered, the generation circuitry 14 creates a new node, and sets this new node to be a destination. In addition, if the target difference information is the end of the range, the generation circuitry 14 sets the end node of the correction network FST to be a destination. Then, the generation circuitry 14 adds an arc, where a source is a source node and the destination is a destination node, to the correction network FST.

The generation circuitry 14 then sets input information and output information to this added arc (step S218). That is, if the difference information is match M, the generation circuitry 14 sets a target character of the recognition text, which is the recognition result text or error correction text, to be the input information, and a target character of the correction sentence text to be the output information. In addition, if the difference information is insert I, the generation circuitry 14 sets an empty character, i.e., empty data, to be the input information, and the target character of the correction sentence text to be the output information. Further, if the difference information is replace R, the generation circuitry 14 sets the target character of the recognition text to be the input information, and the target character of the correction sentence text to be the output information. Then, if the difference information is delete D, the generation circuitry 14 sets the target character of the recognition text to be the input information, and empty data to be the output information. If the input information and output information are decided in this way, the generation circuitry 14 adds the decided input information and output information to the added arc.

After that, the generation circuitry 14 determines whether or not the processing has been performed on all the difference information in the range decided in the above step S216 (step S219). If it is determined that there is unprocessed difference information, the generation circuitry 14 repeats the processing from the above step S217. In this way, the generation circuitry 14 performs the processing of steps S217 and S218 on each difference information in the range decided in the above step S216.

Then, if the processing is completed on all the difference information within the decided range, the generation circuitry 14 updates a lookahead table to be utilized by the error correction circuitry 16 (step S220). The lookahead table holds a target node, an arc (subsequent arc), where the target node is a connection destination node, and a subsequent character string. The subsequent character string is a character string in which input character strings on arcs following the target arc are coupled. FIG. 6 is a diagram showing an example of the correction network FST, and FIG. 7 is a diagram showing a content example of a lookahead table corresponding to the example of the correction network FST of FIG. 6. The lookahead table is utilized for, when searching for a shortest path in the error correction circuitry 16, narrowing down shortest path candidates by deciding a candidate of a next transition arc in arcs having the target node as a connection source. The lookahead table can be stored in the auxiliary storage 103 in the same manner as the correction network memory 15 that stores the correction network.

Note that FIG. 6 shows a correction network FST20. In the figure, a circle is a node 21, and a line connecting circles is an arc 22. A number in a circle is an ID of the node 21, a node with ID0 is a start node, and a node with ID1 is an end node. Regarding characters indicated near the arcs, a character before a colon (:) indicates input information, and a character after a colon indicates output information. The correction network FST20 for the example shown in FIG. 5 will be [start node (node 0)]—(今:京)—[node 2]—(日:都)—[node 3]—(は:は)—[node 4]—(ダ:雨)—[node 5]—(メ)—[node 6]—(で:で)—[node 7]—(す:す)—[node 8]—(ダ)—[end node (node 1)]. Furthermore, there is an ε-transition from [end node] to [start node].

Figure 8:
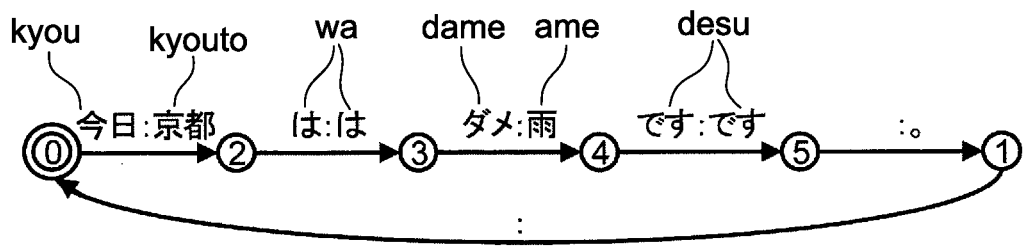
FIG. 8 is a diagram showing an example of the correction network FST in a case of processing in word units.

In a case of processing in word units, prior to the above step S214 to acquire the difference information, morpheme analysis is performed on each of the recognition text, which is the recognition result text or error correction text, and the correction sentence text. The subsequent processing is the same. FIG. 8 is a diagram showing an example of a correction network FST obtained when processing in word units. In this example, the correction network FST will be [start node (node 0)]—(今日:京都)—[node 2]—(は:は)—[node 3]—(ダメ:雨)—[node 4]—(です:です)—[node 5]—(:○)—[end node (node 1)]. Furthermore, there is an ε-transition from [end node] to [start node].

The above description is in a case where the speech recognition result string generated by the recognition circuitry 12 is set to be the first candidate text. Even in a case where a plurality of candidate texts are generated, recognition result error correction can be performed in the same manner. That is, a shortest path with the correction network may be determined for each candidate text, and the error correction may be performed for a candidate text with the smallest shortest path score.

In addition, also in a case where a speech recognition result string is a lattice or confusion network, not a text, recognition result error correction can be performed in the same manner with only the exception that the correction network will be the lattice or confusion network.

Figure 9:
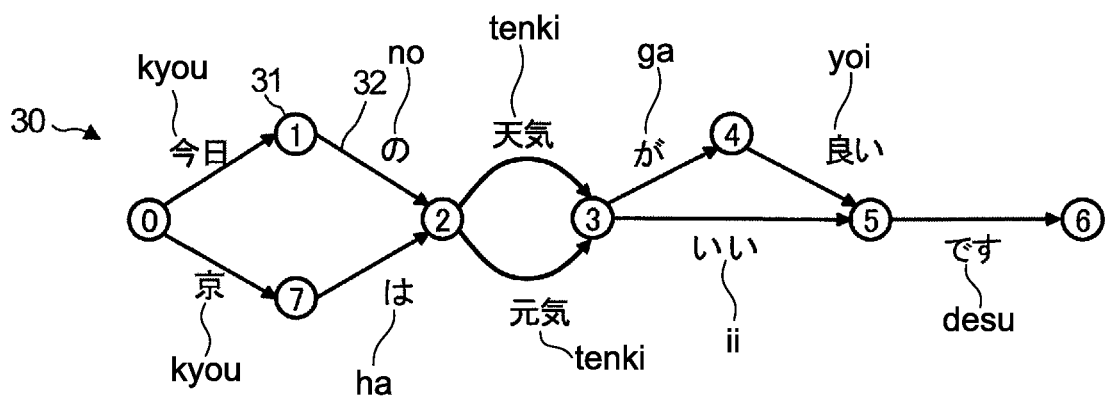
FIG. 9 is a diagram showing an example of a lattice in a case of processing in word units.

FIG. 9 is a diagram showing an example of a lattice. The recognition circuitry 12 generates a recognition result lattice 30 as a speech recognition result string. The recognition result lattice 30 also has nodes 31 and arcs 32, and character or word labels are respectively assigned to the arcs 32. FIG. 9 shows a case where the speech recognition result string is in word units. A series of a plurality of labels respectively assigned to a plurality of arcs 32 on one path from the leftmost start node 31 of the recognition result lattice 30 to the rightmost end node 31 thereof represents one hypothesis of what a spoken sentence is, which is generated as a result of speech recognition. To each arc 32, other than a label, a weight representing a likelihood of the label may be given. A lattice as a correction network created by the generation circuitry 14 also has the same structure.

Figure 10:
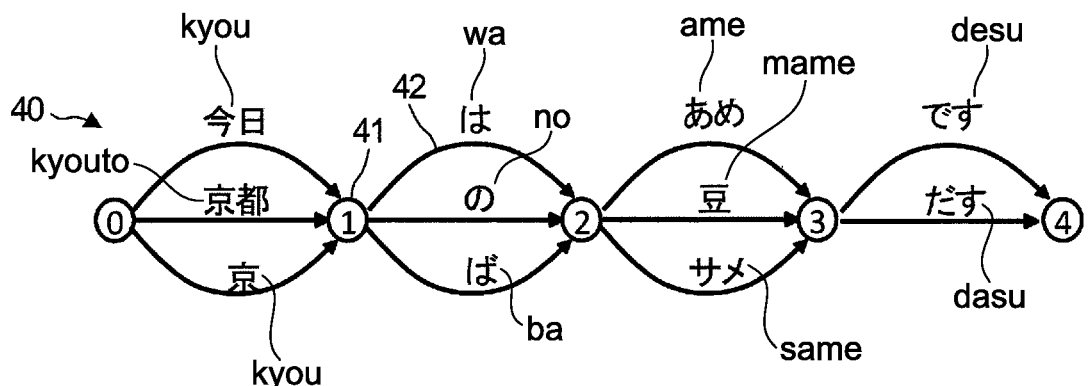
FIG. 10 is a diagram showing an example of a confusion network in a case of processing in word units.

FIG. 10 is a diagram showing an example of a confusion network. The recognition circuitry 12 generates a recognition result confusion network 40 as a speech recognition result string. The recognition result confusion network 40 has a plurality of arcs 42 between a node 41 and another node 41. In the same manner as the recognition result lattice 30, also in the recognition result confusion network 40, character or word labels are respectively assigned to the arcs 42. FIG. 10 shows a case where the speech recognition result string is in word units. One label string from the leftmost starting node 41 of the recognition result confusion network 40 to the rightmost terminating node 41 thereof represents one speech recognition result string candidate. To each arc 42, other than a label, a weight representing a likelihood of the label may be given. A confusion network as a correction network created by the generation circuitry 14 also has the same structure.

As described above, according to the speech recognition error correction apparatus 10 according to the first embodiment, the correction network memory 15 stores a text FST, lattice, and/or confusion network in character or word units as a correction network, where a text, lattice, and/or confusion network in character or word units as a speech recognition result string, which is a result of performing speech recognition on a series of speech data, and a correction result text by a user for the speech recognition result string are associated. The error correction circuitry 16 calculates a shortest path, for example, between a speech recognition result string of an error correction target, which is a result of performing speech recognition on a new series of speech data, and a correction network is calculated. If the minimum value of the shortest path is equal to or less than a threshold, by using a correction network corresponding to the shortest path of the minimum value, the error correction circuitry 16 performs error correction on an error portion of speech recognition in the speech recognition result string of the error correction target. Thereby, a user will not perform the same correction many times, and a cost for correcting the speech recognition result string can be reduced.

In addition, according to the speech recognition error correction apparatus 10 according to the first embodiment, the correction sentence acquisition circuitry 13 acquires a correction result text by the user for the speech recognition error correction result string generated by the error correction circuitry 16 and the generation circuitry 14 calculates a shortest path, for example, between the speech recognition result string of the error correction target and the correction result text. If the shortest path is equal to or less than a threshold, the generation circuitry 14 generates a correction network, where the speech recognition result string of the error correction target and the correction result text are associated and stores the correction network in the correction network memory 15. This enables training of the correction network.

Second Embodiment

A configuration of the speech recognition error correction apparatus according to the second embodiment is different, in the point of synthesizing a conversion rule to a correction network, from the case of the speech recognition error correction apparatus 10 according to the first embodiment. A conversion rule is a correction rule that commonly applies to a plurality of users, not only a particular user. For example, in a case of using the speech recognition error correction apparatus for a reporting agent system, even if a user pronounces "さん ("san")" as the title of a person's name and "さん" is generated as a speech recognition result string, it is necessary to correct the title of a person's name from "さん" to "様 ("sama")" in order to unify the format. In such a case, it is effective to include a conversion rule to correct the title "さん" to "様" in the correction network.

Figure 11:
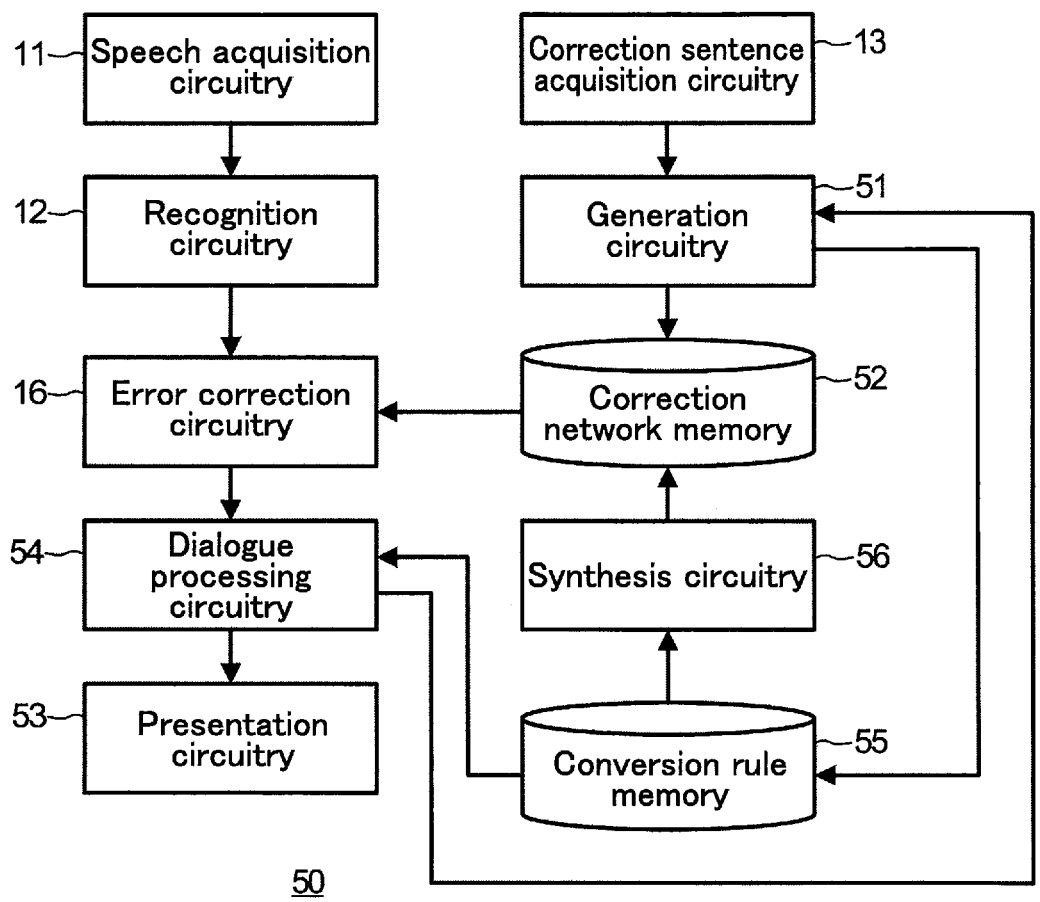
FIG. 11 is a block diagram showing a configuration of a speech recognition error correction apparatus according to a second embodiment.

FIG. 11 is a block diagram showing a configuration of a speech recognition error correction apparatus 50 according to the present embodiment. The speech recognition error correction apparatus 50 includes the speech acquisition circuitry 11, recognition circuitry 12, correction sentence acquisition circuitry 13, and error correction circuitry 16, as the same configurations as those of the speech recognition error correction apparatus 10 according to the first embodiment. The speech recognition error correction apparatus 50 includes a generation circuitry 51, a correction network memory 52, and a presentation circuitry 53, instead of the generation circuitry 14, correction network memory 15, and presentation circuitry 17 in the speech recognition error correction apparatus 10 according to the first embodiment. The speech recognition error correction apparatus 50 further includes a dialogue processing circuitry 54 and a conversion rule memory 55. The speech recognition error correction apparatus 50 may further include a synthesis circuitry 56.

The dialogue processing circuitry 54 performs dialogue processing with a user with respect to, if error correction is performed by the error correction circuitry 16, the error correction result, or if error correction is not performed, the speech recognition result string generated by the recognition circuitry 12, and generates a dialogue result. Specifically, the dialogue processing circuitry 54, for example, presents the error correction result or speech recognition result string to the user by the display device 104. At this time, the dialogue processing circuitry 54 refers to a conversion rule stored in the conversion rule memory 55 and presents a portion of the speech recognition result string that is corrected according to the conversion rule. The dialogue processing circuitry 54 receives correction designation of a portion to be corrected according to the conversion rule and/or new designation of a portion to be newly added to the conversion rule, from the user by the input device 105. The dialogue processing circuitry 54 generates an error correction result or speech recognition result string including information indicating a portion corrected according to the conversion rule and the designation portion from the user, as a dialogue result.

The conversion rule memory 55 stores a plurality of conversion rules. The auxiliary storage 103, for example, can be utilized as this conversion rule memory 55.

The presentation circuitry 53 presents the dialogue result generated by the dialogue processing circuitry 54 to the user by, for example, the display device 104. The user can manually correct this presented dialogue result.

The generation circuitry 51 separates a correction portion due to an error in the recognition result from a correction portion not due to an error in the recognition result, based on the dialogue result generated by the dialogue processing circuitry 54 and the correction sentence acquired by the correction sentence acquisition circuitry 13. For the correction portion due to an error in the recognition result, the generation circuitry 51 generates a correction network in the same manner as the generation circuitry 14 in the first embodiment, and adds or updates the correction network to the correction network memory 52. As for the correction portion not due to an error in the recognition result, the generation circuitry 51 creates a conversion rule based on its correction content, and adds or updates the conversion rule to the conversion rule memory 55.

The synthesis circuitry 56 synthesizes the conversion rule stored in the conversion rule memory 55 to the correction network stored in the correction network memory 52. This makes it possible for the error correction circuitry 16 to perform error correction by the correction network to which the conversion rule is synthesized.

Figure 12A:
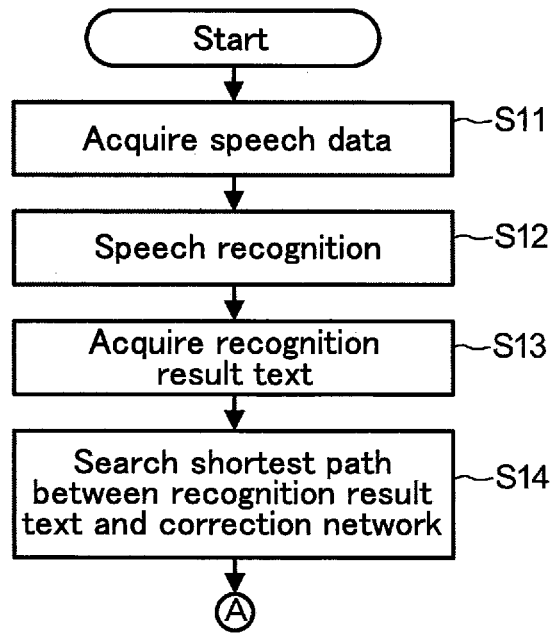
FIG. 12A is a diagram showing a first part of a flowchart showing a procedure of processing of the speech recognition error correction apparatus according to the second embodiment.
Figure 12B:
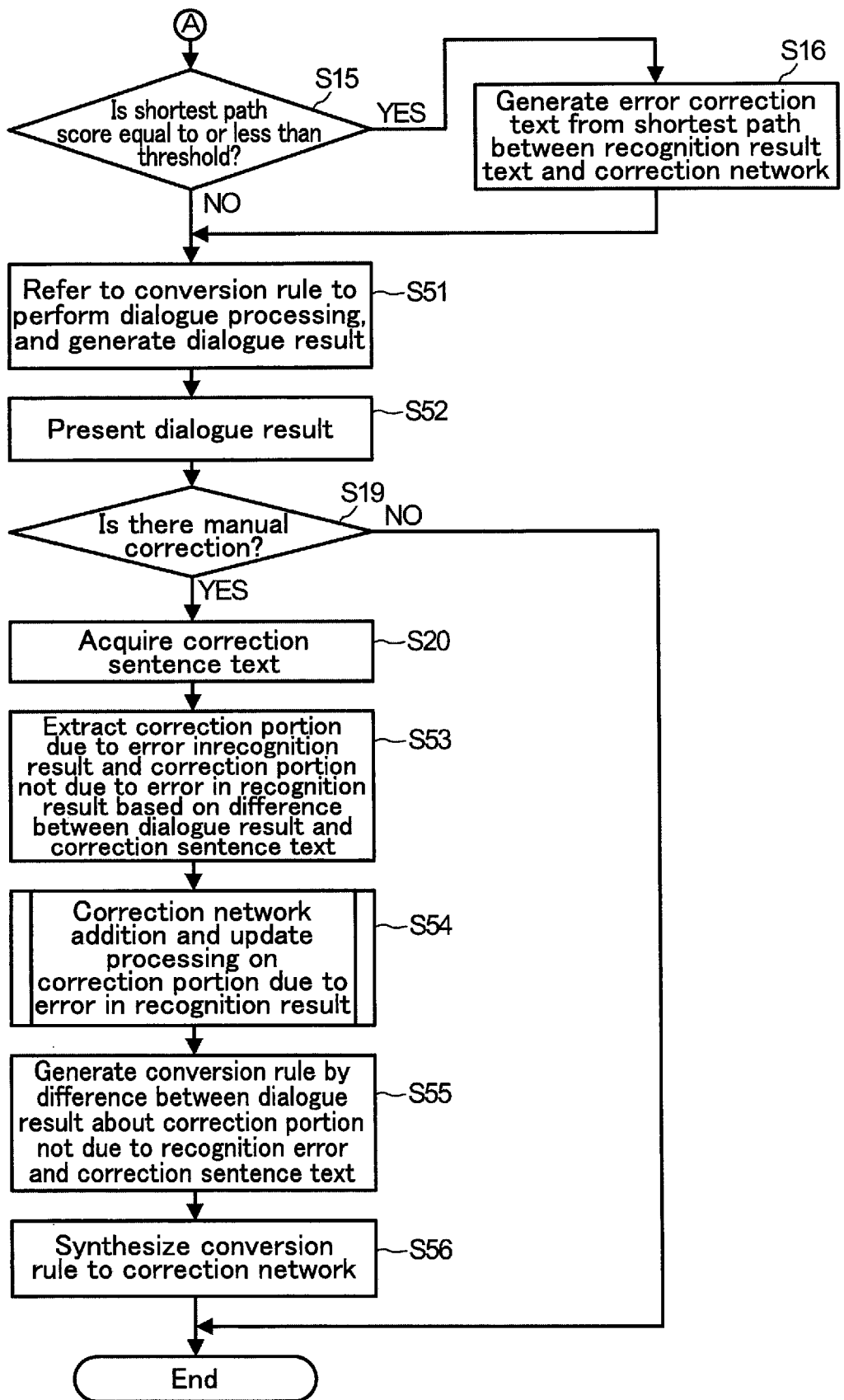
FIG. 12B is a diagram showing a second part of the flowchart showing the procedure of the processing of the speech recognition error correction apparatus according to the second embodiment.

Hereinafter, an operation of the speech recognition error correction apparatus 50 according to the present embodiment will be described only for poi ions that are different from the operation of the speech recognition error correction apparatus 10 according to the first embodiment, while omitting descriptions for portions that are the same. FIGS. 12A and 12B are a series of flowcharts showing a procedure of a processing function of the speech recognition error correction apparatus 50, which is realized by a processor, which is the controller 101, executing a speech recognition error correction program. Similarly to the above first embodiment, a case where a speech recognition result string is the first candidate text will be described as an example.

Since steps S11 to S16 are the same as those in the speech recognition error correction apparatus 10 according to the first embodiment, descriptions thereof will be omitted.

Following the above step S15 or S16, the dialogue processing circuitry 54 performs dialogue processing with the user, and generates a dialogue result (step S51). That is, if the error correction circuitry 16 determines that the shortest path score is larger than the threshold in the above step S15, the dialogue processing circuitry 54 presents the recognition result text, which is the speech recognition result string generated by the recognition circuitry 12, to the user. In addition, if the error correction circuitry 16 generates the error correction text in the above step S16, the dialogue processing circuitry 54 presents the error correction text to the user. When presenting this recognition result text or error correction text, the dialogue processing circuitry 54 refers to the conversion rule stored in the conversion rule memory 55, and presents a correction portion of the speech recognition result string that is corrected according to the conversion rule. Then, the dialogue processing circuitry 54 receives correction designation of a portion to be corrected according to the conversion rule and/or registration designation of a portion to be newly added to the conversion rule, from the user, and generates the recognition result text or error correction text including information indicating these designation portions and information indicating the correction portion by the Above conversion rule, as a dialogue result. Note that the dialogue processing circuitry 54 may present the recognition result text or error correction text in a manner such that the correction portion can be identified to the external device via the network by the communication device 106, instead of being presented by the display device 104, and receive the user's designation portions from the external device by the communication device 106 to generate a dialogue result.

The presentation circuitry 53 presents the dialogue result generated by the dialogue processing circuitry 54 to the user by, for example, the display device 104 (step S52). Note that the presentation circuitry 53 may present the dialogue result to the external device via the network by the communication device 106, instead of being presented by the display device 104.

The correction sentence acquisition circuitry 13 determines whether or not manual correction by the user is performed on the dialogue result presented by the presentation circuitry 53 (step S19). This can be determined by, for example, whether there is a correction operation by a user operation of the input device 105 or there is reception of a correction sentence text from the external device by the communication device 106. If the manual correction is not performed, the speech recognition error correction apparatus 10 ends the processing shown in this flowchart.

In contrast, if it is determined that the manual correction is performed, the correction sentence acquisition circuitry 13 acquires a correction sentence text, which is a result of the manual correction (step S20).

Based on the dialogue result generated by the dialogue processing circuitry 54 and the correction sentence text acquired by the correction sentence acquisition circuitry 13, the generation circuitry 51 extracts a correction portion due to an error in the recognition result and a correction portion not due to an error in the recognition result in the correction sentence text (step S53). For example, the generation circuitry 51 can determine that, in the correction sentence text, portions included in the dialogue result that correspond to a correction portion by the conversion rule and a portion for which correction designation or registration designation by the user is received are not correction portions due to an error in the recognition result. The generation circuitry 51 performs correction network addition and update processing on the correction portion due to an error in the recognition result (step S54). In this correction network addition and update processing, the generation circuitry 51 determines a shortest path between a text of the correction portion due to an error in the recognition result in the dialogue result and a correction sentence text portion corresponding thereto. If a shortest path score is equal to or less than a certain threshold, the generation circuitry 51 adds the text of the correction portion due to an error in the recognition result and the correction sentence text portion corresponding thereto to the correction network.

In addition, the generation circuitry 51 generates a conversion rule using a difference between a portion of the dialogue result regarding the correction portion not due to an error in the recognition result and a correction sentence text portion corresponding thereto, and adds or updates the conversion rule to the conversion rule memory 55 (step S55).

After that, the synthesis circuitry 56 synthesizes the conversion rule stored in the conversion rule memory 55 to the correction network stored in the correction network memory 52 (step S56). Herein, the synthesis circuitry 56 acquires the conversion rule, and generates an FST from the conversion rule. Since the correction network is created as an FST, the correction network can be synthesized with the FST of the conversion rule. This can be performed by using synthesis processing, which is an existing technology of the FST. When synthesizing, after normal FST synthesis, a start node of the correction network may be connected to a start node of the FST of the conversion rule, and an end node of the FST of the conversion rule may be connected to an end node of the correction network. Then, the speech recognition error correction apparatus 50 ends the processing shown in this flowchart.

Note that the speech recognition error correction apparatus 50 performs the processing of step S54 based on the correction portion due to an error in the recognition result and the processing of steps S55 and S56 based on the correction portion not due to an error in the recognition result continuously in this order as processing based on an extraction result in step S53. The speech recognition error correction apparatus 50 may perform the processing of step S54 after performing the processing of steps S55 and S56 first. In addition, the speech recognition error correction apparatus 50 may perform the processing of step S54 and the processing of steps S55 and S56 in parallel. Furthermore, the processing of step S56 may not be performed.

As described above, according to the speech recognition error correction apparatus 50 according to the second embodiment, the conversion rule memory 55 stores a predetermined conversion rule, which is a correction rule that commonly applies to a plurality of users. The dialogue processing circuitry 54 applies the conversion rule to a speech recognition error correction result string generated by the error correction circuitry 16 to correct it. Thereby, words such as an honorific title that needs to be unified among a plurality of users can be automatically corrected without depending on the utterance of the users. Thus, it is not necessary to make a correction for unification, and it is possible to reduce the correction cost for the user.

In addition, according to the speech recognition error correction apparatus 50 according to the second embodiment, it is possible, in the dialogue processing circuitry 54, to present where a correction portion corrected by applying the conversion rule is to the user, and receive a designation, such as a change of a correction portion, a change of a correction content, and a portion to be newly added to the conversion rule. Then, in the generation circuitry 51, with respect to the correction portion not due to an error in the speech recognition based on those designations, a conversion rule is generated by a difference between the speech recognition result string of the error correction target and the correction result, and is stored in the conversion rule memory 56. Thereby, registration and correction of the conversion rule can be performed.

In addition, according to the speech recognition error correction apparatus 50 according to the second embodiment, it is also possible to update the correction rule by synthesizing the conversion rule stored in the conversion rule memory 55 to the correction network stored in the correction network memory 52 by the synthesis circuitry 56.

Note that the speech recognition error correction apparatuses 10 and 50 according to the above embodiments may not include the speech acquisition circuitry 11 and recognition circuitry 12_ Instead, the speech recognition error correction apparatuses 10 and 50 can include a speech-related information acquisition circuitry that acquires speech data and a speech recognition result string. The speech-related information acquisition circuitry may be formed to acquire speech data and a speech recognition result string via a storage medium or a network, and output the speech recognition result string to the generation circuitry 14 and error correction circuitry 16, and present the speech data to the user as speech by the presentation circuitry 17 via the error correction circuitry 16.

In addition, in the above embodiments, an example has been described in which a series of characters or words are acquired as a speech recognition result string, and addition and updating of a correction network in character or word units and error correction using the correction network are performed. However, the above descriptions are also applicable in the same manner to a case where a series of phonemes are acquired as a speech recognition result string.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech recognition error correction apparatus comprising:
   a correction network memory configured to store a correction network, where a speech recognition result string, which is a result of performing speech recognition on a series of speech data, and a correction result by a user for the speech recognition result string are associated;

an error correction circuitry configured to:
    calculate a difference between a speech recognition result string of an error correction target, which is a result of performing speech recognition on a new series of speech data, and the correction network stored in the correction network memory,
    when a value indicating the difference is equal to or less than a threshold, perform error correction on a speech recognition error portion in the speech recognition result string of the error correction target by using the correction network to generate a speech recognition error correction result string, and
    when the value indicating the difference is larger than the threshold, not perform the error correction using the correction network; and
a presentation circuitry configured to:
    present the speech recognition error correction result string when the error correction circuitry performs the error correction, and
    present the speech recognition result string of the error correction target when the error correction circuitry does not perform the error correction.

2. The speech recognition error correction apparatus according to claim 1, further comprising:
a correction sentence acquisition circuitry configured to acquire the correction result by the user for the speech recognition error correction result string generated by the error correction circuitry; and
a generation circuitry configured to calculate a difference between the speech recognition result string of the error correction target and the correction result, and when a value indicating the calculated difference is equal to or less than a threshold, generate the correction network, where the speech recognition result string of the error correction target and the correction result are associated, and store the generated correction network in the correction network memory.

3. The speech recognition error correction apparatus according to claim 2, wherein
the difference between the speech recognition result string of the error correction target and the correction network is a shortest path between the speech recognition result string of the error correction target and the correction network,
a difference between the speech recognition result string of the error correction target and the correction result is a shortest path between the speech recognition result string of the error correction target and the correction result, and
a value indicating the difference is a shortest path score.

4. The speech recognition error correction apparatus according to claim 1, further comprising:
a conversion rule memory configured to store a predetermined conversion rule, which is a correction rule that commonly applies to a plurality of users; and
a dialogue processing circuitry configured to apply the conversion rule stored in the conversion rule memory to the speech recognition error correction result string generated by the error correction circuitry, and correct the speech recognition error correction result string.

5. The speech recognition error correction apparatus according to claim 4, wherein the dialogue processing circuitry presents a correction portion that is corrected by applying the conversion rule in the speech recognition error correction result string.

6. The speech recognition error correction apparatus according to claim 5, wherein the dialogue processing circuitry is configured to receive designation by a user of a portion to be registered in the conversion rule in the speech recognition error correction result string, and
the speech recognition error correction apparatus further comprises a presentation circuitry configured to present the speech recognition error correction result string together with the correction portion and the designated designation portion by the dialogue processing circuitry.

7. The speech recognition error correction apparatus according to claim 6, further comprising:
a correction sentence acquisition circuitry configured to acquire the correction result by the user for the speech recognition error correction result string generated by the error correction circuitry; and
a generation circuitry configured to:
    extract a correction portion due to a speech recognition error and a correction portion not due to a speech recognition error in the correction result based on the correction portion and the designation portion by the dialogue processing circuitry;
    for the correction portion due to the speech recognition error, when the value indicating a difference between the speech recognition result string of the error correction target and the correction result is equal to or less than a threshold, generate the correction network, where the speech recognition result string of the error correction target and the correction result are associated, and store the generated correction network in the correction network memory; and
    for the correction portion not due to the speech recognition error, generate the conversion rule by the difference between the speech recognition result string of the error correction target and the correction result, and store the generated conversion rule in the conversion rule memory.

8. The speech recognition error correction apparatus according to claim 7, further comprising a synthesis circuitry configured to synthesize the conversion rule stored in the conversion rule memory to the correction network stored in the correction network memory.

9. The speech recognition error correction apparatus according to claim 1, wherein the speech recognition result string, the correction result, and the speech recognition error correction result string are one of character strings and word strings.

10. The speech recognition error correction apparatus according to claim 1, wherein the speech recognition result string and the correction network are expressed by at least one of a text, a lattice, which is a candidate network, and a confusion network.

11. The speech recognition error correction apparatus according to claim 1, further comprising:
a speech acquisition circuitry configured to acquire the new series of speech data; and
a recognition circuitry configured to perform speech recognition on the new series of speech data acquired by the speech acquisition circuitry, and generate the speech recognition result string of the error correction target.

12. A method for correcting a speech recognition error comprising:
storing a correction network, where a speech recognition result string, which is a result of performing speech recognition on a series of speech data, and a correction result by a user for the speech recognition result string are associated, in a correction network memory;

calculating a difference between a speech recognition result string of an error correction target, which is a result of performing speech recognition on a new series of speech data, and the correction network stored in the correction network memory;

when a value indicating the difference is equal to or less than a threshold, performing error correction for a speech recognition error portion in the speech recognition result string of the error correction target by using the correction network to generate a speech recognition error correction result string;

when the value indicating the difference is larger than the threshold, not performing the error correction using the correction network;

presenting the speech recognition error correction result string when the error correction is performed; and presenting the speech recognition result string of the error correction target when the error correction is not performed.

13. A non-transitory storage medium storing a speech recognition error correction program for causing a computer to:

in order to correct a speech recognition error portion in a speech recognition result string, which is a result of performing speech recognition on a series of speech data, perform speech recognition for a new series of speech data to generate a speech recognition result string of an error correction target;

calculate a difference between a pre-stored correction network, where the speech recognition result string, which is a result of performing the speech recognition on the series of speech data, and a correction result by a user for the speech recognition result string are associated, and the speech recognition result string of the error correction target;

when a value indicating the difference is equal to or less than a threshold, perform error correction on a speech recognition error portion in the speech recognition result string of the error correction target by using the correction network to generate a speech recognition error correction result string;

when the value indicating the difference is larger than the threshold, not perform the error correction using the correction network;

present the speech recognition error correction result string when the error correction is performed; and present the speech recognition result string of the error correction target when the error correction is not performed.

* * * * *